US012716712B2

(12) United States Patent
Hanzawa et al.

(10) Patent No.: US 12,716,712 B2
(45) Date of Patent: Aug. 25, 2026

(54) SHAPE MEASUREMENT SYSTEM AND SHAPE MEASUREMENT METHOD

(71) Applicants: NTT, Inc., Tokyo (JP); THE UNIVERSITY OF TOKYO, Tokyo (JP)

(72) Inventors: Nobutomo Hanzawa, Musashino (JP); Kazuhide Nakajima, Musashino (JP); Takashi Matsui, Musashino (JP); Hideaki Murayama, Tokyo (JP); Ryota Wada, Tokyo (JP); Makito Kobayashi, Tokyo (JP)

(73) Assignees: NTT, Inc., Tokyo (JP); THE UNIVERSITY OF TOKYO, Tokyo (JP)

( * ) Notice: Subject to any disclaimer, the term of this patent is extended or adjusted under 35 U.S.C. 154(b) by 95 days.

(21) Appl. No.: 18/706,667

(22) PCT Filed: Nov. 29, 2022

(86) PCT No.: PCT/JP2022/043879
§ 371 (c)(1),
(2) Date: May 1, 2024

(87) PCT Pub. No.: WO2023/120055
PCT Pub. Date: Jun. 29, 2023

(65) Prior Publication Data

US 2025/0060213 A1 Feb. 20, 2025

(30) Foreign Application Priority Data

Dec. 24, 2021 (JP) ................................ 2021-210127

(51) Int. Cl.
*G01B 11/16* (2006.01)

(52) U.S. Cl.
CPC .................................. *G01B 11/16* (2013.01)

(58) Field of Classification Search
CPC .... G01B 11/16; G01B 11/18; G02B 6/02042; G02B 6/4202; G01D 5/3538
See application file for complete search history.

(56) References Cited

U.S. PATENT DOCUMENTS 7,324,714 B1 1/2008 Cranch et al.
2007/0156019 A1 7/2007 Larkin et al.
(Continued)

FOREIGN PATENT DOCUMENTS

JP 2001324358 A 11/2001
JP 2002185063 A 6/2002
(Continued)

OTHER PUBLICATIONS

Translation (Year: 2014).*
(Continued)

*Primary Examiner* — Tony Ko
(74) *Attorney, Agent, or Firm* — Harness, Dickey & Pierce, P.L.C.

(57) ABSTRACT

The present disclosure is a shape measurement system including: a multi-core optical fiber in which four or more cores are disposed in a part other than the center of a cross section; a strain distribution measurement device configured to measure a strain distribution of each of the cores in a longitudinal direction of the multi-core optical fiber; and an analysis device configured to calculate a shape of the multi-core optical fiber by using the strain distribution of the multi-core optical fiber.

9 Claims, 15 Drawing Sheets

(56) References Cited

U.S. PATENT DOCUMENTS

2014/0202015 A1 7/2014 Briggs
2021/0187752 A1 6/2021 Roye et al.
2021/0396927 A1* 12/2021 Harker ................. H04B 10/073
2022/0390224 A1* 12/2022 Ju ..................... C03B 37/01234
2023/0147800 A1 5/2023 Hanzawa et al.
2023/0152170 A1 5/2023 Nakamura et al.
2024/0019323 A1 1/2024 Matsui et al.

FOREIGN PATENT DOCUMENTS

JP 2016102691 A 6/2016
WO WO-2014083989 A1 * 6/2014 ............. G01L 1/242
WO 2021/176667 A1 9/2021
WO WO-2021246497 A1 12/2021
WO WO-2022097466 A1 5/2022

OTHER PUBLICATIONS

Duncan, Roger et al., "High-accuracy fiber-optic shape sensing," Proceedings of SPIE, https://doi.org/10.1117/12.720914 (Apr. 10, 2017).
Park, Yong-Lae et al., "Real-Time Estimation of 3-D Needle Shape and Deflection for MRI-Guided Interventions" (2010). DOI:10.1109/TMECH.2010.2080360.
Kobayashi, Makito et al., "Basic Study of Shape Sensing for Large-Scale Line Structures with Multi-Core Fibers by Brillouin OTDR", OFT 2020-19, 2020 with machine generated English translation thereof.

* cited by examiner 100
91
11
11
11
11
r
Cc
12
91
STRAIN DISTRIBUTION MEASUREMENT DEVICE
92
ANALYSIS DEVICE
93

Fig. 7
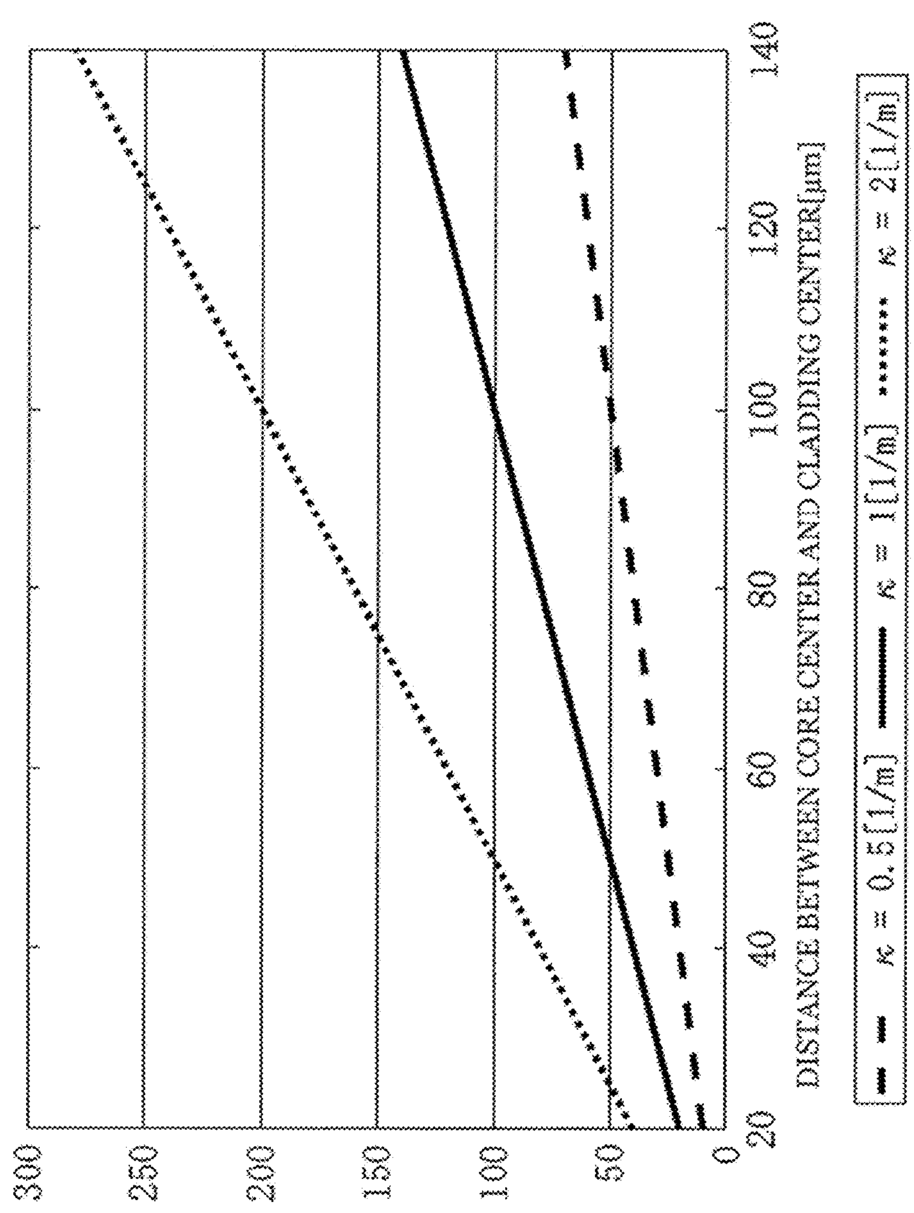
STRAIN GENERATED IN CORE[με]
300
250
200
150
100
50
0
20
40
60
80
100
120
140
DISTANCE BETWEEN CORE CENTER AND CLADDING CENTER[μm]
κ = 0.5[1/m]
κ = 1[1/m]
κ = 2[1/m]

SHAPE MEASUREMENT SYSTEM AND SHAPE MEASUREMENT METHOD

CROSS-REFERENCE TO RELATED APPLICATIONS

This application is a 371 U.S. National Phase of International Application No. PCT/JP2022/043879, filed on Nov. 29, 2022, which claims priority to Japanese Application No. 2021-210127, filed on Dec. 24, 2021. The entire disclosures of the above applications are incorporated herein by reference.

TECHNICAL FIELD

The present disclosure relates to a technique for deriving a three-dimensional shape of a measuring object on the basis of measurement and analysis of a strain distribution in a light propagation direction of a multi-core optical fiber installed along the measuring object.

BACKGROUND ART

A reflection spectrum in a frequency domain of each core of a multi-core optical fiber (hereinafter sometimes referred to as MCF (Multi Core Fiber).) is measured by optical frequency domain reflectometry (OFDR), and a measurement result is analyzed, so that a three-dimensional shape of a measuring object can be derived (see, for example, Non Patent Literatures 1 and 2.). However, in identification of a three-dimensional shape using the OFDR, in which high resolution on the order of several tens of millimeters can be achieved, a measurement distance is limited to about several tens of meters.

A method for improving measurement resolution by applying fiber bragg gratings (FBG) to the entire length of a sensing medium is known (see, for example, Non Patent Literature 1.). However, there is the problem that the manufacturability and economic efficiency of the sensing medium are deteriorated.

On the other hand, shape identification can also be performed using quasi-distribution measurement by application of FBGs or the like (see, for example, Non Patent Literature 2.). However, this technique has the problem that the number of measurement points is limited and shape identification over a long distance is difficult to perform.

In addition, shape identification using an MCF has also been proposed (see, for example, Non Patent Literature 3.). Non Patent Literature 3 uses Brillouin optical time domain reflectometry (BOTDR) capable of measurement over a long distance ranging from several kilometers to several tens of kilometers. However, Non Patent Literature 3 requires a core at the center of a cladding of the MCF, and thus it is impossible to use a four-core fiber having no core at the center of a cladding used for communication.

Furthermore, in Non Patent Literature 3, it is necessary to increase a distance between a central core and a peripheral core for shape sensing with a small curvature. However, when a cladding diameter is increased in order to increase the core interval, a problem occurs in which breakage due to bending of the optical fiber is likely to occur.

CITATION LIST

Non Patent Literature

Non Patent Literature 1: https://doi.org/10.1117/12.720914 (High-accuracy fiber-optic shape sensing)

Non Patent Literature 2: DOI: 10.1109/TMECH.2010.2080360 (Real-Time Estimation of 3-D Needle Shape and Deflection for MRI-Guided Interventions)

Non Patent Literature 3: Kobayashi et al., "Basic Study of Shape Sensing for Large-Scale Line Structures with Multi-Core Fibers by Brillouin OTDR", OFT 2020-19, 2020.

SUMMARY OF INVENTION

Technical Problem

An object of the present disclosure is to achieve shape identification of a measuring object over a long distance using a multi-core optical fiber having no core at the center of a cladding.

Solution to Problem

Specifically, a shape measurement system of the present disclosure includes:

a multi-core optical fiber in which four or more cores are disposed in a part other than the center of a cross section;

a strain distribution measurement device configured to measure a strain distribution of each of the cores in a longitudinal direction of the multi-core optical fiber; and an analysis device configured to calculate a shape of the multi-core optical fiber by using the strain distribution of the multi-core optical fiber.

Specifically, a shape measurement method of the present disclosure includes:

using a multi-core optical fiber in which four or more cores are disposed in a part other than the center of a cross section and measuring, by means of a strain distribution measurement device, a strain distribution of each of the cores in a longitudinal direction of the multi-core optical fiber; and calculating, by means of an analysis device, a shape of the multi-core optical fiber by using the strain distribution of the multi-core optical fiber.

Advantageous Effects of Invention

The present disclosure can achieve shape identification of a measuring object over a long distance using a multi-core optical fiber having no core at the center of a cladding.

BRIEF DESCRIPTION OF DRAWINGS

FIG. 7 illustrates an example of the distance r and a strain amount generated in a core.

DESCRIPTION OF EMBODIMENTS

Figure 1:
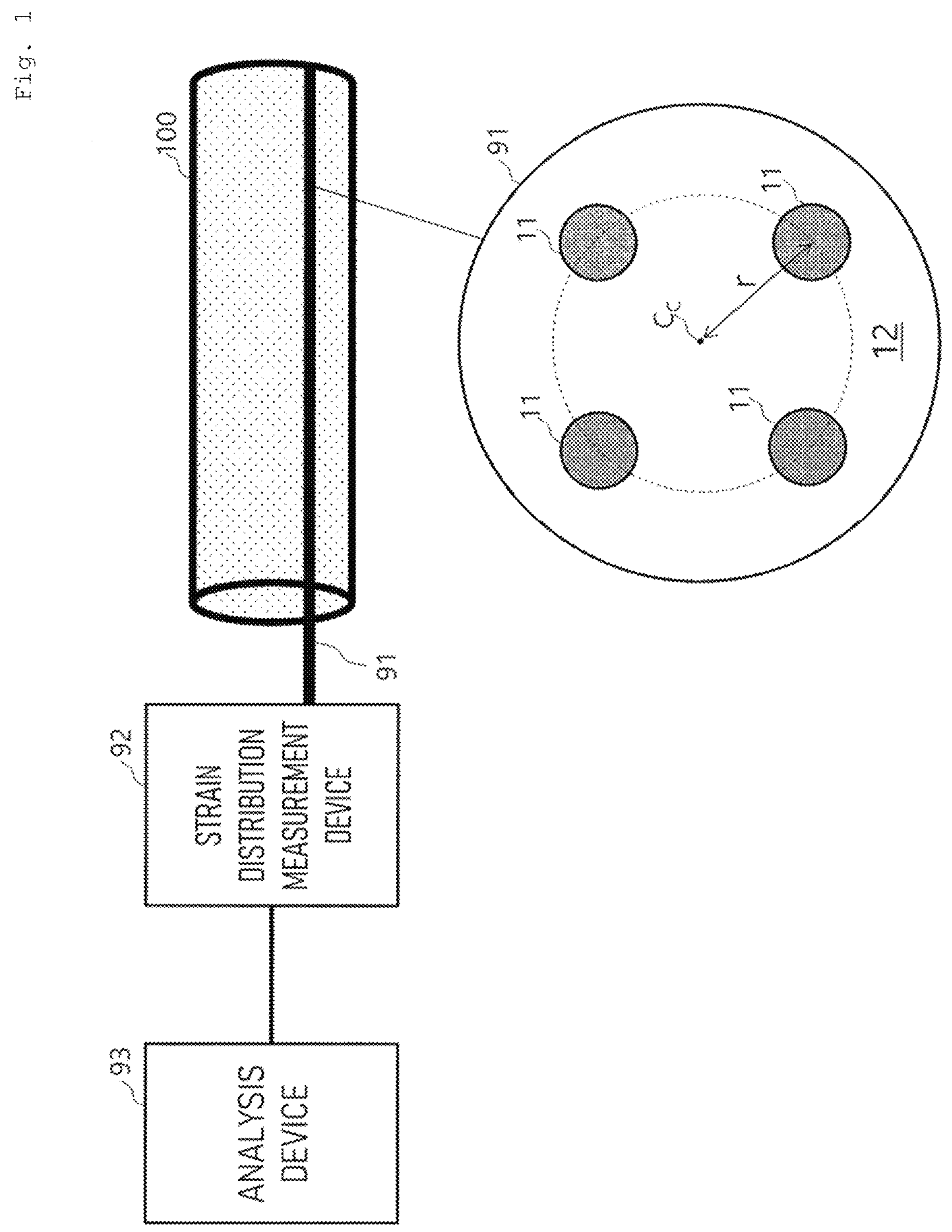
FIG. 1 illustrates an example of a system configuration of the present disclosure.

Hereinafter, embodiments of the present disclosure will be described in detail with reference to the drawings. Note that the present disclosure is not limited to the following embodiments. These embodiments are merely examples, and the present disclosure can be implemented in a form with various modifications and improvements applied on the basis of the knowledge of a person skilled in the art. Note that components having the same reference numerals in the present specification and the drawings indicate the same components.

First Exemplary Embodiment

FIG. 1 illustrates an example of a system configuration of the present disclosure.

A system that achieves a shape identification method of the present disclosure includes a multi-core optical fiber 91 used for extracting a shape change of a measuring object 100, a strain distribution measurement device 92 that detects a strain distribution in a propagation direction of each core 11 of the multi-core optical fiber 91, and an analysis device 93 that analyzes measurement data acquired by the strain distribution measurement device 92.

The multi-core optical fiber 91 is installed along a longitudinal direction of the measuring object 100. The multi-core optical fiber 91 includes a total of four cores 11 disposed in a cladding 12. In the drawing, as an embodiment example, an example is illustrated in which the four cores 11 are disposed on a square lattice at substantially equal intervals on substantially the same circumference at a distance r from the cross-sectional center of the cladding 12, in a region other than the cross-sectional center of the cladding 12.

In the exemplary embodiment of the present disclosure, an example in which the four cores 11 have substantially the same refractive index distribution and optical characteristic will be described. However, the cores 11 included in the MCF 91 may have a structure in which the cores are disposed so as to intentionally make their refractive index distributions and optical characteristics different. In addition, although the exemplary embodiment of the present disclosure shows an example in which the number of cores 11 is four, the number of cores 11 may be four or more. In addition, the cores 11 of the MCF 91 may be disposed at intervals that are not the equal intervals, but it is preferable that the cores 11 are disposed equally to some extent in the cross section of the MCF 91. For example, when the number of cores is four, the cores may be separately disposed in four quadrants in an orthogonal coordinate.

Figure 2:
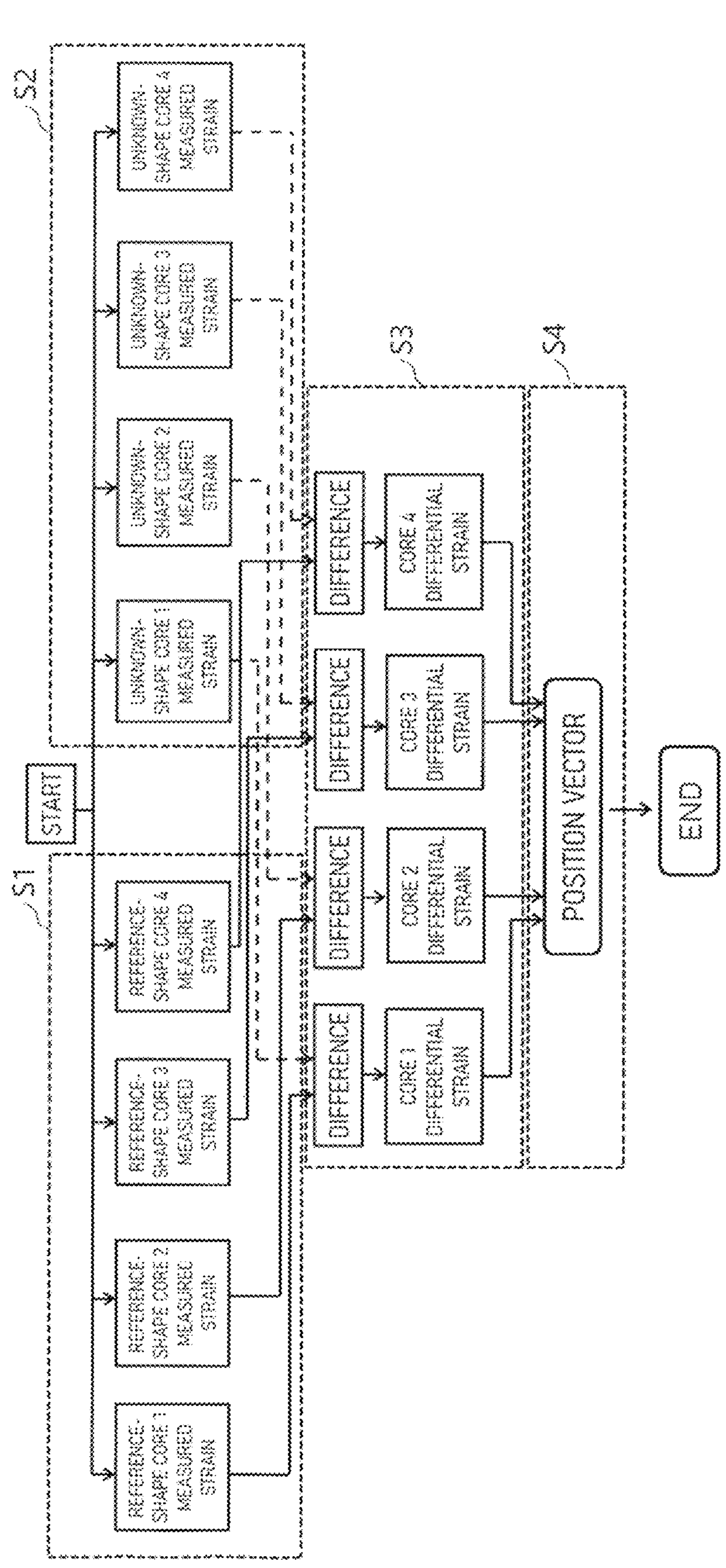
FIG. 2 illustrates an example of a flow executed by a system of the present disclosure.

In the MCF 91 of the exemplary embodiment of the present disclosure, a change in an extending state of the MCF 91 is detected using an MCF in which a cladding outer diameter is set to 125 μm and a core interval is set to 35 μm to 45 μm in order to reduce crosstalk between the cores. In addition, as the strain distribution measurement device 92, a BOTDR device that measures a backward Brillouin scattering light distribution is used. FIG. 2 illustrates an example of a flow executed in the shape identification method of the present disclosure.

First, the MCF 91 is laid on the measuring object 100, and the strain distribution characteristic of each core 11 in a steady state is acquired using the strain distribution measurement device 92 (step S1). As a result, the analysis device 93 acquires a strain distribution in a reference shape of the MCF 91.

Next, in a state where a three-dimensional shape of the measuring object 100 has changed, the strain distribution characteristic of each core 11 is acquired again using the strain distribution measurement device 92 (step S2). As a result, the analysis device 93 acquires a strain distribution in an unknown shape of the MCF 91.

Next, using the data acquired in step S1 and the data acquired in step S2, a differential strain in step S2 with respect to step S1 is derived at each point of the MCF 91 where the strain distribution measurement device 92 measures a strain (step S3). A differential strain Ei thus calculated in step S3 is the sum of a strain Eb due to bending of the MCF 91 and an axial strain Ea in the longitudinal direction of the MCF 91.

Figure 3:
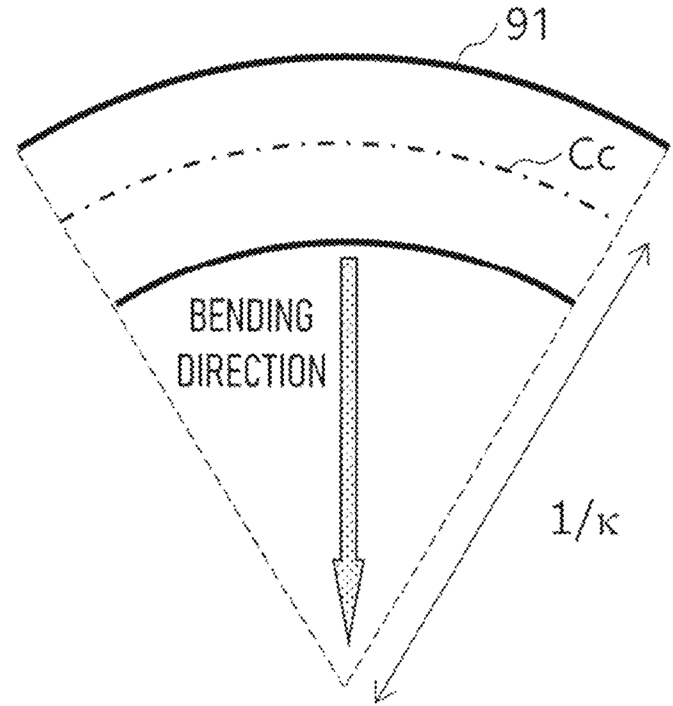
FIG. 3 is an explanatory diagram of a curvature k in the present disclosure.

When the MCF 91 is bent as illustrated in FIG. 3, a bending strain $\varepsilon_{b,i}$, a curvature k, and a bending angle β in each core Ci (i=1 to 4) are expressed by Relational Formula (1).

$$\varepsilon_{b,i} = r \cdot K \cdot \cos(\alpha_i - \beta) \tag{1}$$

Note that r represents a distance from a central axis $C_c$ of the cladding 12 to the core 11, and $\alpha_i$ represents an angle of the core 11 in the cross section of the MCF 91.

Figure 4:
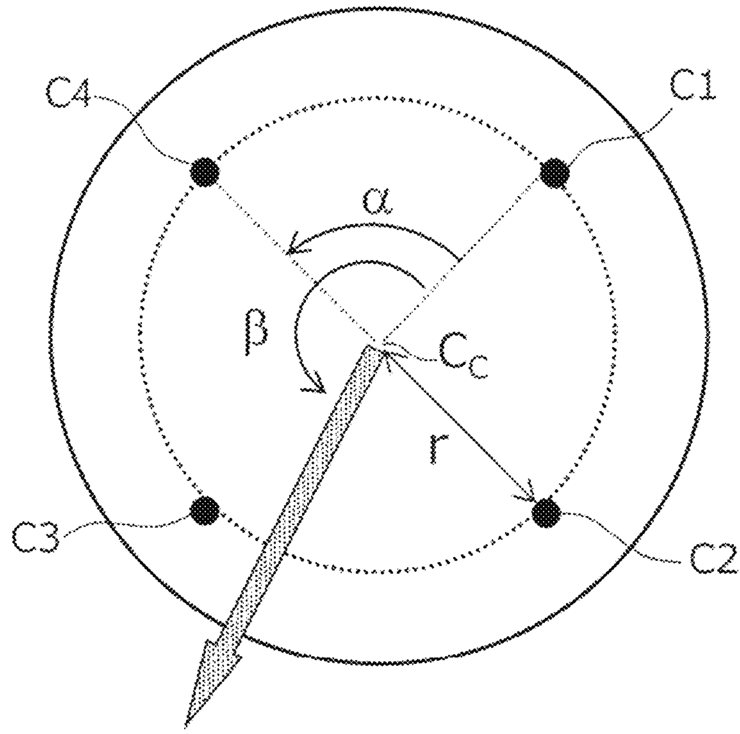
FIG. 4 is an explanatory diagram of a distance r, an angle $\alpha$, and a bending angle $\beta$ in the present disclosure.

FIG. 4 illustrates a specific example of the distance r, the angle α, and the bending angle β. An angle $\alpha_1$ is an angle formed between a line connecting a core C1 and the central axis $C_c$ of the MCF 91 and a line connecting a core C4 adjacent to the core C1 and the central axis $C_c$ of the MCF 91. In the present embodiment, since the cores C1 to C4 are disposed at substantially equal intervals on the concentric circle, the angles $\alpha_1$ to $\alpha_4$ are 90 degrees.

Here, the axial strain $\varepsilon_a$ is uniformly generated with respect to the cross section of the MCF 91, and thus is constant regardless of the core number i. Therefore, the differential strain $\varepsilon_i$ at the core number i calculated in step S3 is expressed by Formula (2).

$$\varepsilon_i = \varepsilon_a + \varepsilon_{b,i} \tag{2}$$

In the present embodiment, since there are four cores 11, quartic simultaneous equations are obtained. In addition, the axial strain $\varepsilon_a$, the curvature k in the bending strain, and the bending angle $\beta$ are equal in any core 11. Therefore, the differential strain $\varepsilon_i$ of each core 11 is obtained using the least squares method or the like. (step S3)

Finally, a position vector of the magnitude, corresponding to the differential strain ci, in a direction corresponding to the curvature k and the bending angle $\beta$ at each point of a distance z where the strain is measured is determined using the Frenet-Serret integral formula (step S4). As a result, it is practical to obtain direction and extent of deformation at each point of the distance z of the multi-core optical fiber 91, and thus it is practical to measure the shape of the multi-core optical fiber 91 after deformation from the steady state.

Note that position accuracy can be improved by correcting a start point and an end point of a measured section in the distance z of the multi-core optical fiber 91. In addition, although the BOTDR is used for the strain distribution measurement in the present exemplary embodiment, any means capable of measuring a strain of an optical fiber such as optical frequency domain reflectometry (OFDR) may be used.

Figure 5A:
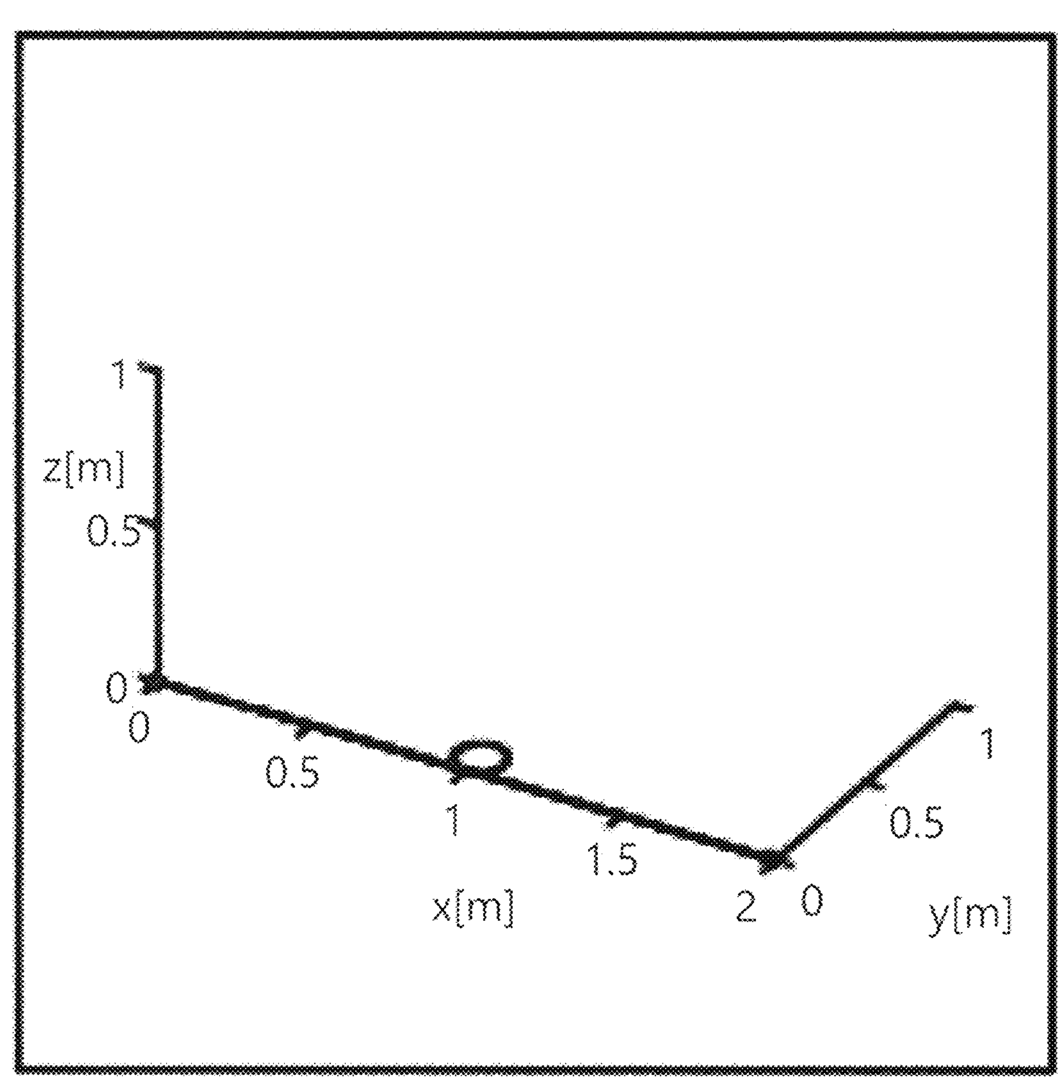
FIG. 5A illustrates a first extraction example of a three-dimensional shape change in an exemplary embodiment of the present disclosure.
Figure 5B:
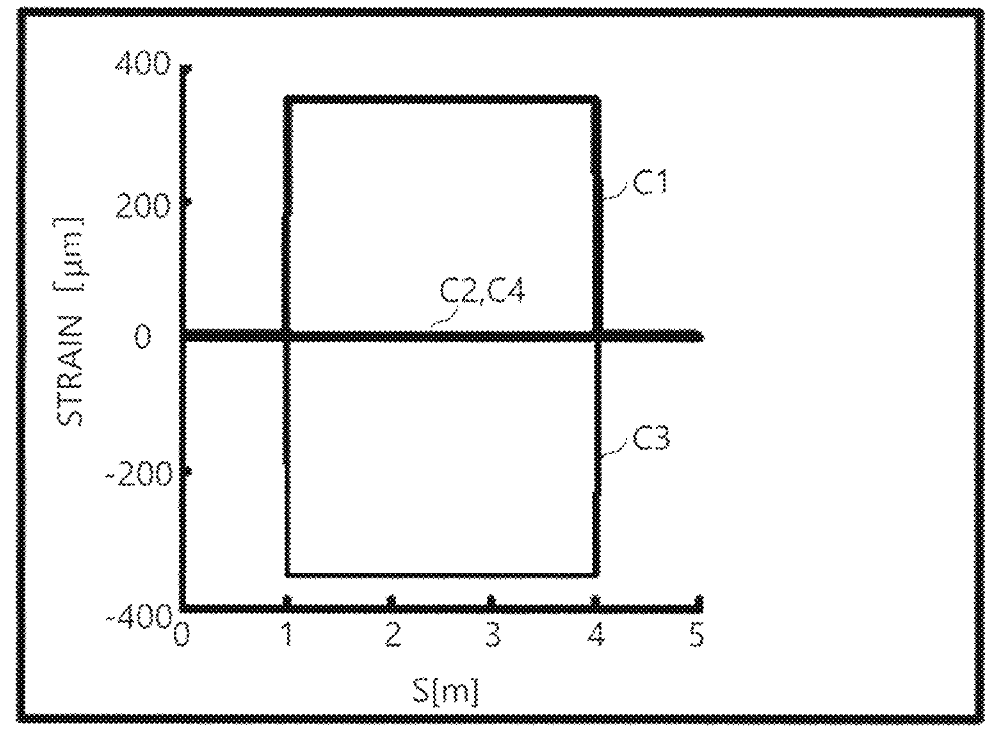
FIG. 5B illustrates the first extraction example of the three-dimensional shape change in the exemplary embodiment of the present disclosure.
Figure 5C:
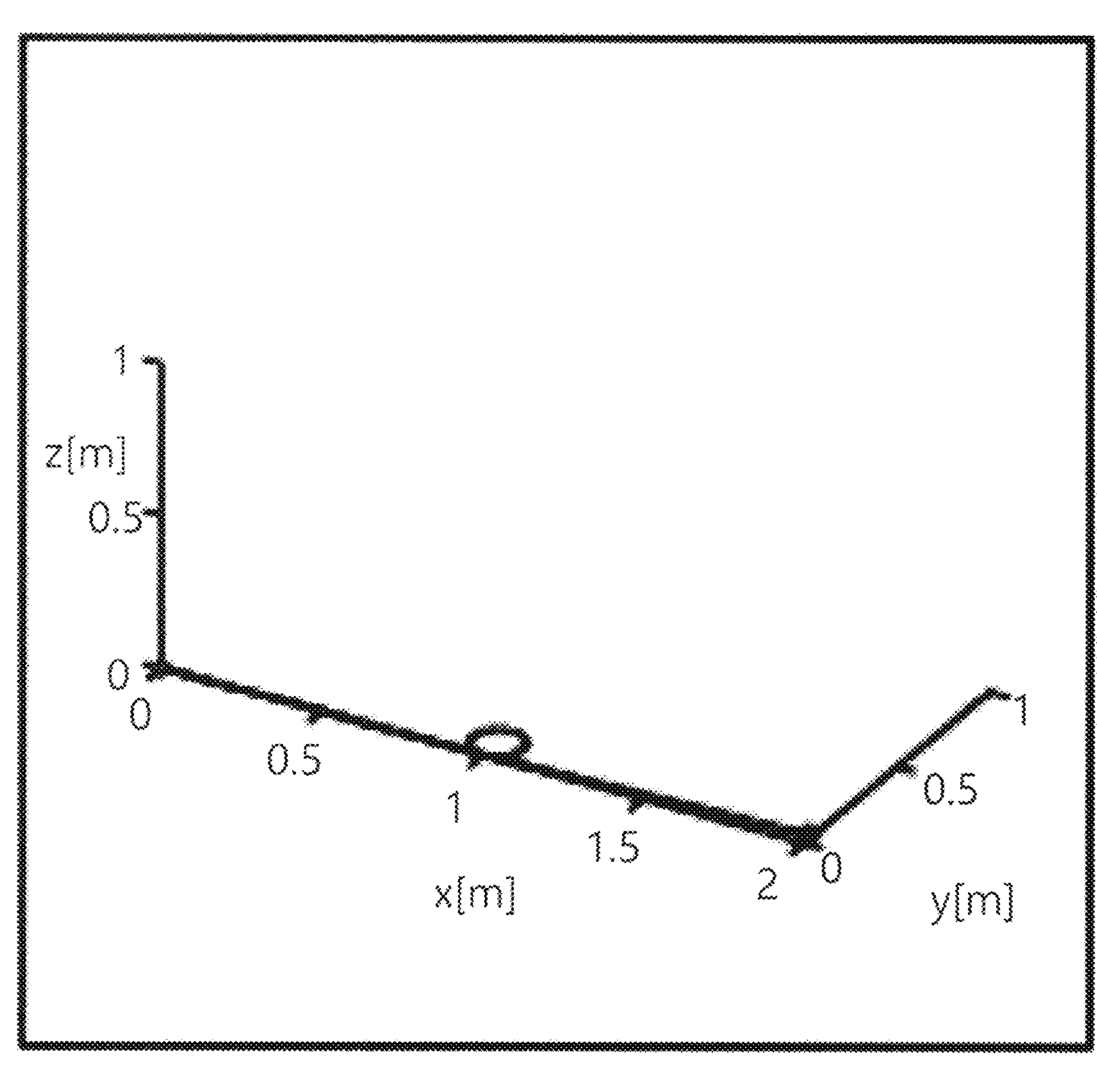
FIG. 5C illustrates the first extraction example of the three-dimensional shape change in the exemplary embodiment of the present disclosure.

FIGS. 5A to 5C illustrate an extraction example of a three-dimensional shape change in the exemplary embodiment of the present disclosure. In the exemplary embodiment of the present disclosure, the strain distribution data in the reference shape in step S1 of FIG. 2 was acquired in a state where the MCF 91 for sensing was linearly extended. Next, step S2 was executed by making one loop at a constant curvature on an xy plane counterclockwise so that the measuring object 100 was disposed in the middle of the MCF 91 as illustrated in FIG. 5A. As a result, the strain distribution data in the unknown shape in FIG. 5B was acquired. Solid lines C1, C2, C3, and C4 in FIG. 5B represents difference among their respective core numbers i. FIG. 5C illustrates a result of shape identification by calculating the shape of the MCF 91 changed from the reference shape on the basis of the strain distribution data in steps S1 and S2. From this result, it can be seen that the curvature of the bending in the middle of the measuring object 100 can be accurately detected.

Figure 6A:
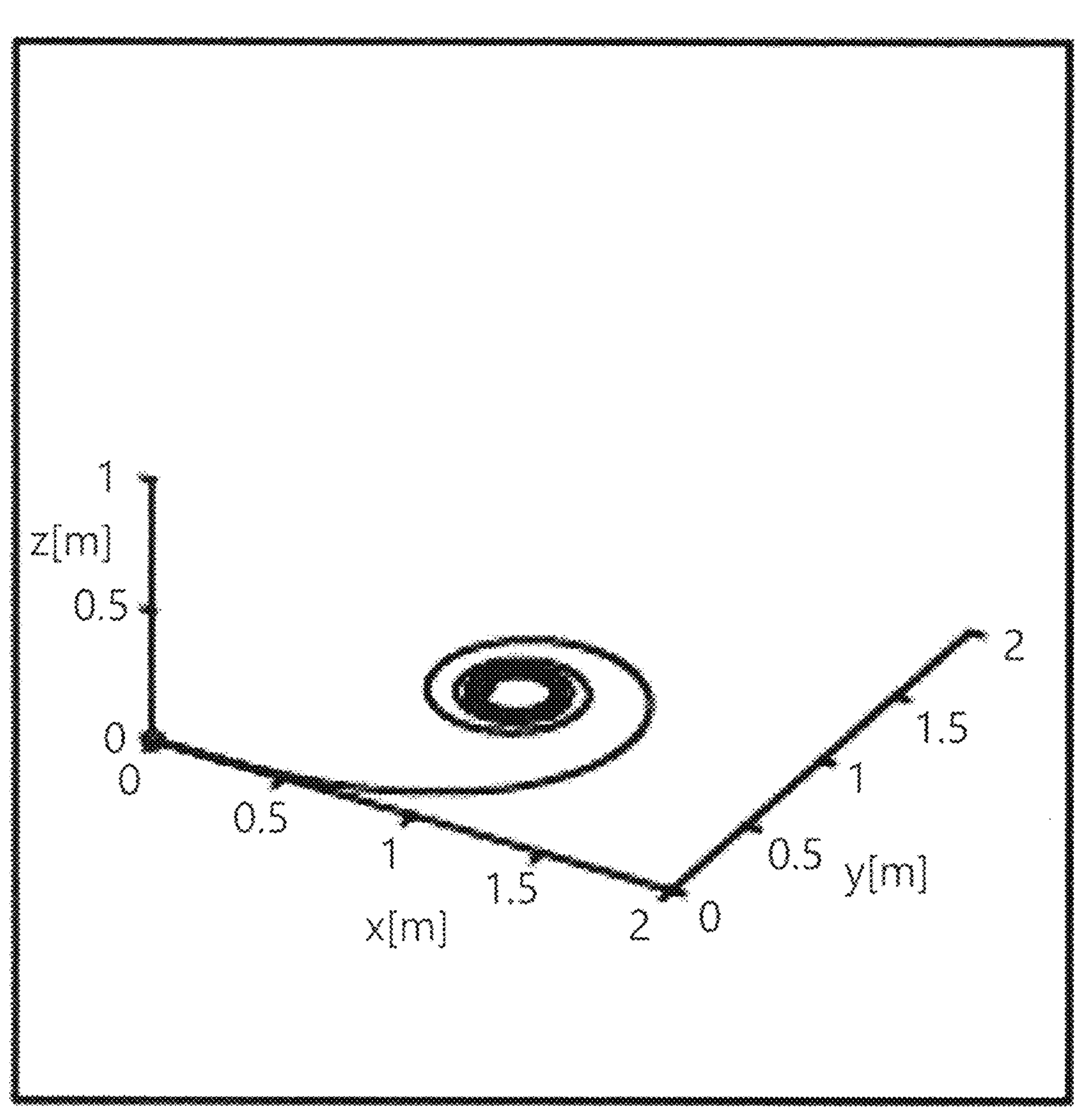
FIG. 6A illustrates a second extraction example of the three-dimensional shape change in the exemplary embodiment of the present disclosure.
Figure 6B:
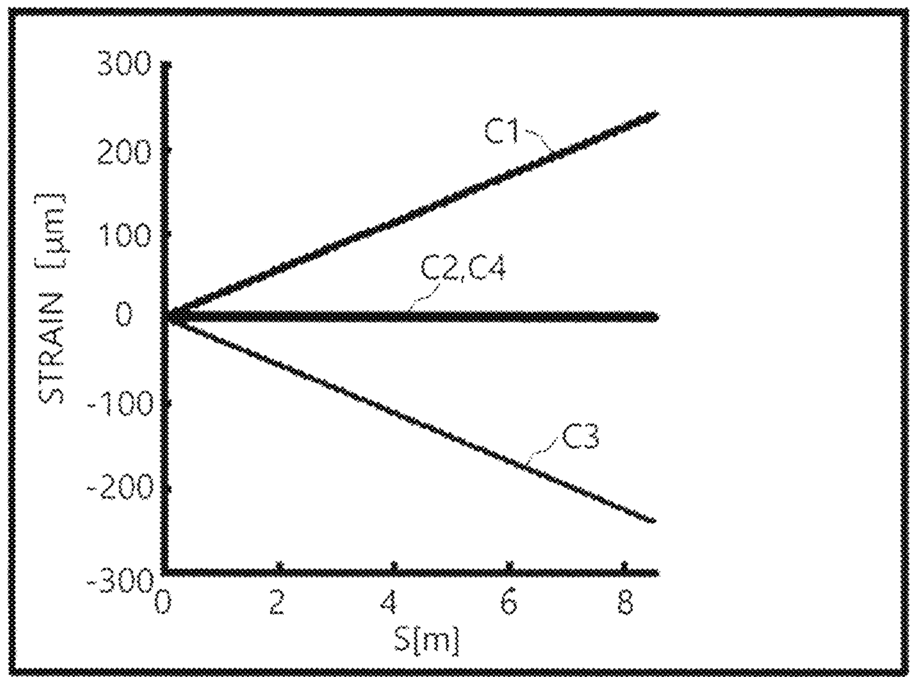
FIG. 6B illustrates the second extraction example of the three-dimensional shape change in the exemplary embodiment of the present disclosure.
Figure 6C:
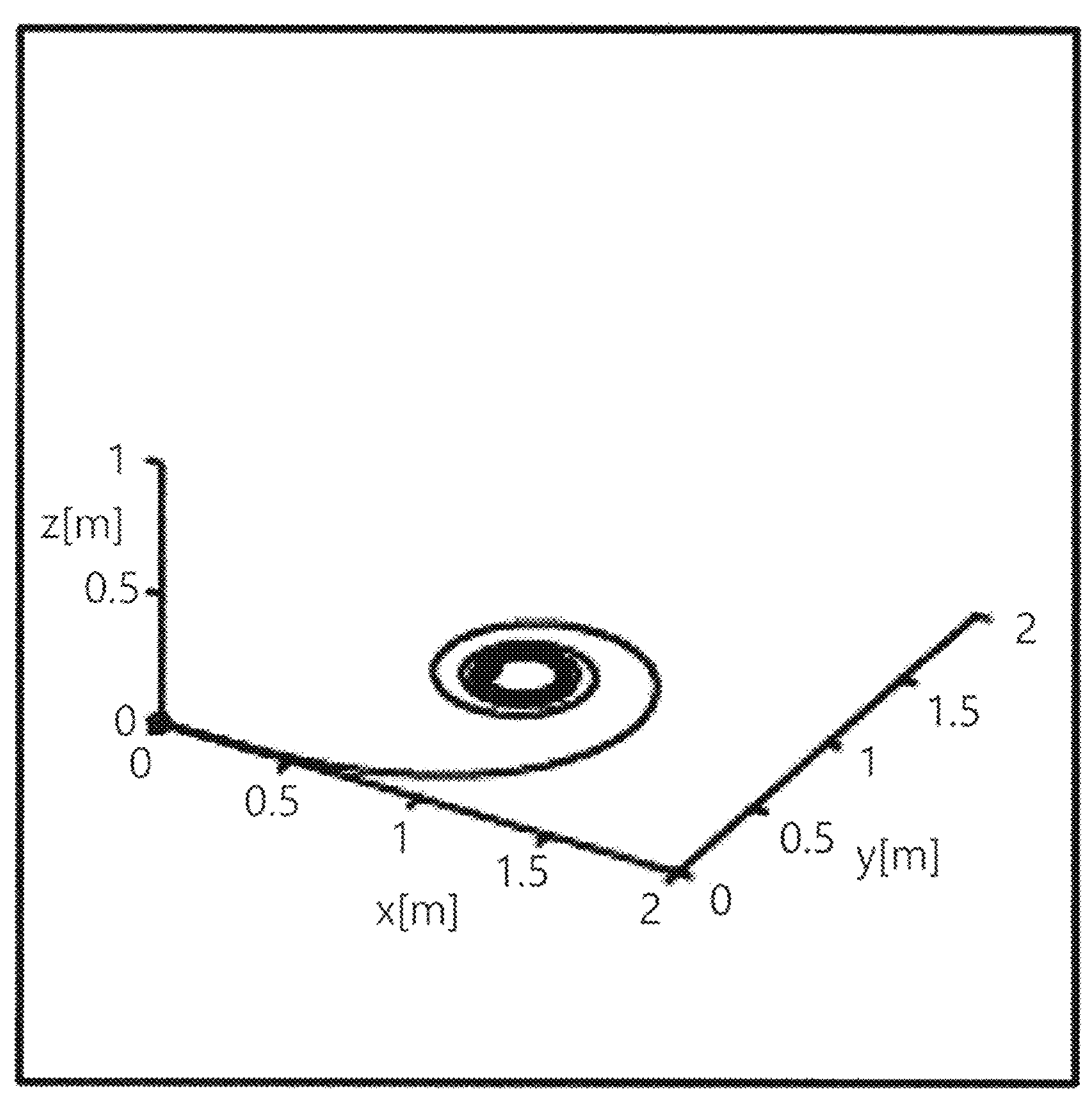
FIG. 6C illustrates the second extraction example of the three-dimensional shape change in the exemplary embodiment of the present disclosure.

FIGS. 6A to 6C illustrate an extraction example of the three-dimensional shape change in the exemplary embodiment of the present disclosure. Similarly to the example of FIGS. 5A to 5C, the strain distribution data in the reference shape in step S1 of FIG. 2 was acquired in a state where the MCF 91 for sensing was linearly extended. Next, step S2 was executed by deforming the end part of the MCF 91 along the measuring object 100 that spirals on an xy plane as illustrated in FIG. 6A. As a result, the strain distribution data in the unknown shape in FIG. 6B was acquired. Solid lines C1, C2, C3, and C4 in FIG. 6B represents difference among their respective core numbers i. FIG. 6C illustrates a result of shape identification by calculating the shape of the MCF 91 changed from the reference shape on the basis of the strain distribution data in steps S1 and S2. From this result, it can be seen that the shape change in which the curvature gradually decreases to the end side of the MCF 91 can be accurately detected.

Second Exemplary Embodiment

Figure 8A:
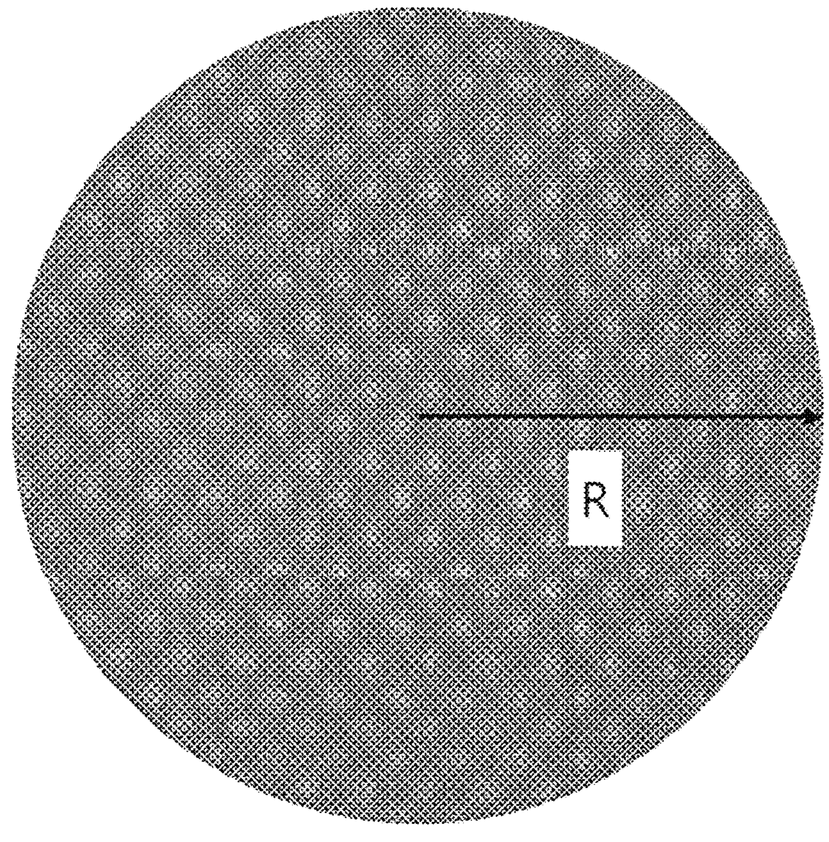
FIG. 8A illustrates a cross-sectional structure example of a solid optical fiber.

FIG. 7 illustrates an example of the amount of strain generated in the core 11 with respect to the distance r. Difference in line type in FIG. 7 represents difference in curvature, and it can be seen that increase in the distance r from the central axis $C_c$ of the cladding 12 to the core 11 causes increase in the amount of strain, and a minute change is more easily extracted. In the MCF 91, in order to increase the distance r between the central axis $C_c$ of the cladding 12 and the center of the core 11, it is necessary to increase the diameter of the cladding 12. As the cladding diameter is increased, the rigidity of the optical fiber increases, the optical fiber itself is more difficult to bend, and the possibility of breakage also increases. The rigidity of the optical fiber depends on a cross-sectional shape of the optical fiber, and a solid optical fiber in which the entire optical fiber is glass, as illustrated in FIG. 8A, has a section modulus expressed by Formula (3).

[Numerical Formula 3]

$$\frac{\pi}{32}R^3 \tag{3}$$

Figure 8B:
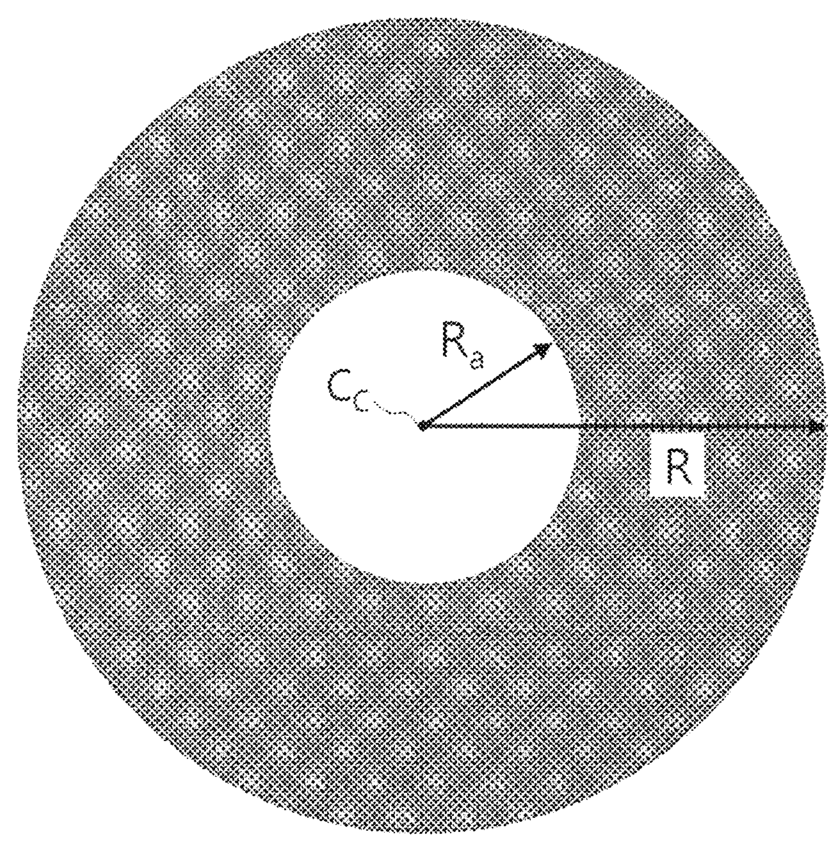
FIG. 8B illustrates a cross-sectional structure example of a hollow optical fiber.

On the other hand, the present disclosure does not require the core 11 at the cladding central axis $C_c$ and can thereby adopt a hollow optical fiber, in which the central axis $C_c$ of the cladding 12 is hollow as illustrated in FIG. 8B. A section modulus in this instance is expressed by Formula (4).

[Numerical Formula 4]

$$\frac{\pi}{32}\frac{R^4-R_a^4}{R} \tag{4}$$

Figure 8C:
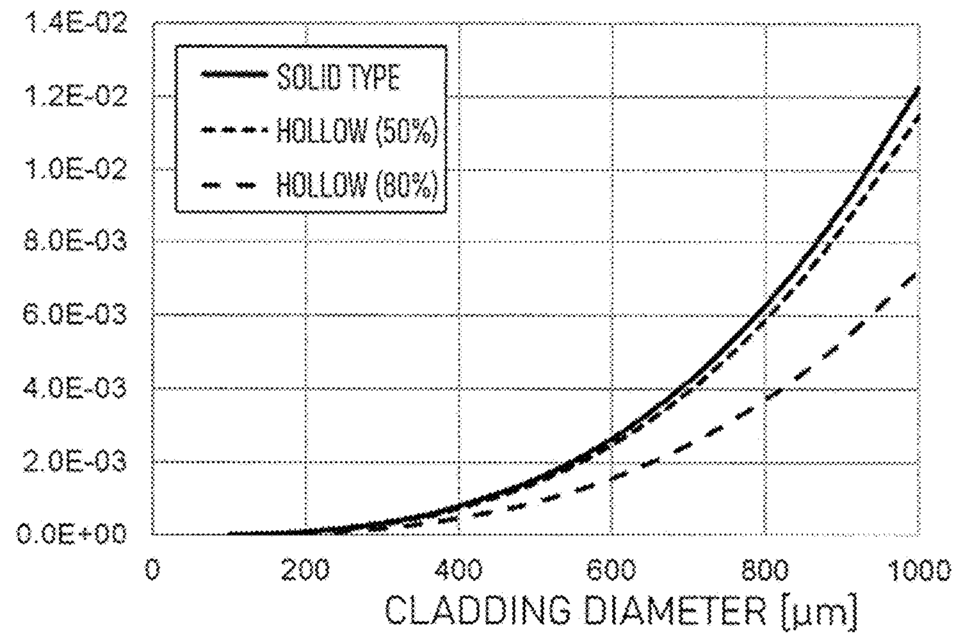
FIG. 8C illustrates an example of a section modulus with respect to a cladding diameter.

FIG. 8C illustrates the section moduli with respect to the diameter of the cladding 12 calculated using Formulas (3) and (4). Non Patent Literature 3 discloses that it is possible to perform shape identification without breakage in an MCF in which the cladding 12 has a diameter of 375 μm. It can be understood that setting the hollow area to 80% can keep the same level of rigidity, with the cladding 12 even having a diameter of 430 μm, as that of the cladding 12 having a diameter of 375 μm. Since the hollow MCF is usable in the present disclosure, the distance r from the cladding central axis $C_c$ to the core 11 can be increased as compared with the solid type illustrated in FIG. 8A. Therefore, the present disclosure can detect a minute amount of strain.

Third Exemplary Embodiment

Figure 9:
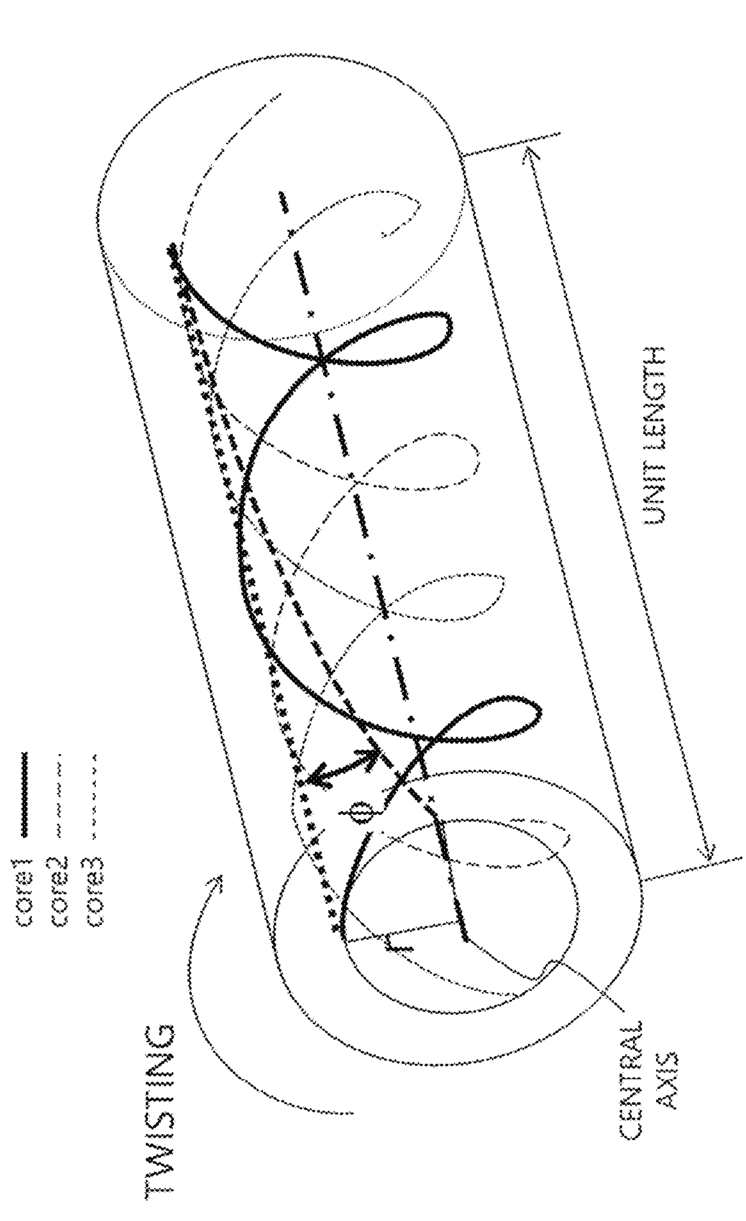
FIG. 9 illustrates an example of an MCF used in an exemplary embodiment of the present disclosure.

In extracting the three-dimensional shape change using the MCF 91, an error may occur in the measurement result due to occurrence of unintended twisting. Therefore, in the present embodiment, a certain number of twists are intentionally applied per unit length in manufacturing the MCF used for shape identification as illustrated in FIG. 9. Here, in the drawing, an example where the number of cores is three is illustrated for easy understanding. As a result, in the MCF 91 of the present embodiment, under condition of applying unintended twists the number of which is equal to or less than the number of twists applied in advance, it is practical to infer the unintended twists applied later. Therefore, a strain resulting from the unintended twists can be eliminated, and the accuracy of shape identification can be improved.

A system configuration of a shape measurement system of the present embodiment is different from the configuration described with reference to FIG. 1 in that the known twists are applied to the MCF 91, and in addition, an analysis procedure of the analysis device 93 related thereto is different. Specifically, a shape measurement method of the present embodiment is different therefrom in the analysis in steps S3 and S4 illustrated in FIG. 2.

In step S3 of FIG. 2, the differential strain Ei, obtained by finding the difference between the strain distribution of each core 11 in the unknown shape and the strain distribution of each core 11 in the reference shape, is expressed by the sum of the bending strain $\varepsilon_{b,i}$ and the axial strain ca. In the present embodiment, since the MCF 91 is twisted, the differential strain $\varepsilon_i$ is the sum of the bending strain $\varepsilon_{b,i}$, the axial strain $\varepsilon_a$, and a twisting strain $\varepsilon_t$. In addition, the bending strain $\varepsilon_{b,i}$ of Formula (1) is expressed by Formula (5), and respective coefficients are expressed by (6) to (9).

[Numerical Formula 5]

$$\varepsilon_{b,i} = k_1 \cdot r \cdot K \cdot \cos(\omega_i - \beta) \quad (5)$$

$$k_1 = \left(1 - v(2\pi pr)^2\right)/\left(1 + (2\pi pr)^2\right) \quad (6)$$

$$\omega_i = a_i + \int_0^z (2\pi p + \phi t)\Big) dt \quad (7)$$

$$\phi = \varepsilon_t / (k_2 r) \quad (8)$$

$$k_2 = 2\pi pr / \left\{(2\pi pr)^2 + 1\right\} \quad (9)$$

$k_1$ and $k_2$ are correction coefficients for the twisting, $\omega_i$ is an angle indicating the position of the core number i, v is a Poisson's ratio, p is a spin rate of the core 11 on the circumference, and $\varphi$ is a specific angle of twist. Here, the spin rate is the number of twists applied to the MCF 91 [times/m].

Since the relative positional relationship between the cores 11 does not change, the sum of $\varepsilon_{b,i}$ is 0. Therefore, the sum of the differential strains $\varepsilon_i$ is expressed by Formula (10).

[Numerical Formula 10]

$$\sum\nolimits_{i=1}^{i} \varepsilon_i = i \times \varepsilon_t + i \times \varepsilon_a \quad (10)$$

The curvature k, the bending angle $\beta$, the axial strain $\varepsilon_a$, and the twisting strain $\varepsilon_t$ satisfying Formulas (5) and (10) are determined by the least squares method or the like (step S4). Finally, a position vector of the magnitude, corresponding to the differential strain Ei of the multi-core optical fiber, in a direction corresponding to the curvature k and the bending angle $\beta$ at each point of a distance z where the strain is measured is determined using the Frenet-Serret integral formula. As a result, it is practical to obtain direction and extent of deformation at each point of the distance z of the multi-core optical fiber 91, and thus it is practical to measure the shape of the multi-core optical fiber 91 after deformation from the steady state.

(Effects of Present Disclosure)

The present disclosure enables shape identification by using the core disposition structure in which there is no core at the center of the multi-core optical fiber used for detecting a shape change. In addition, shape identification over several tens of meters is performed in OFDR, whereas shape identification over several kilometers or several tens of kilometers is enabled. Furthermore, according to the present disclosure, because a hollow optical fiber is usable as the MCF 91, it is practical to increase the strain and improve the measurement sensitivity enough to measure a minute shape, by increasing the outer diameter of the MCF and increasing the distance between the cladding center and the core center.

INDUSTRIAL APPLICABILITY

The present disclosure can be used for measures against infrastructure aging by deriving a three-dimensional shape of a measuring object.

REFERENCE SIGNS LIST

11 Core
12 Cladding
91 Multi-core optical fiber
92 Strain distribution measurement device
93 Analysis device
100 Measuring Object

The invention claimed is:

1. A shape measurement system comprising:

a multi-core optical fiber in which four or more cores are disposed in a part other than a center of a cross section;

a strain distribution measurement device configured to measure a strain distribution of each of the cores in a longitudinal direction of the multi-core optical fiber; and an analysis device configured to calculate a shape of the multi-core optical fiber by using the strain distribution of the multi-core optical fiber and to determine a curvature and bending angle at points along the multi-core optical fiber by solving simultaneous equations based on axial strain on each core is equal to each other.

2. The shape measurement system according to claim 1, wherein the strain distribution measurement device measures in advance the strain distribution in a reference shape of the multi-core optical fiber, and the analysis device calculates the shape of the multi-core optical fiber changed from the reference shape by comparing the strain distribution, measured by the strain distribution measurement device, with the strain distribution in the reference shape.

3. The shape measurement system according to claim 2, wherein the analysis device obtains a differential strain by using the strain distribution, measured by the strain distribution measurement device, and the strain distribution in the reference shape, calculates a position vector at each point of the multi-core optical fiber where the strain distribution measurement device measures a strain, by using the differential strain, and measures the shape of the multi-core optical fiber in a three-dimensional space by using the position vector.

4. The shape measurement system according to claim 1, wherein a known twist is applied to the multi-core optical fiber, and the analysis device infers a strain of an unintended twist caused by a shape change of the multi-core optical fiber, based on a strain resulting from the known twist, and excludes the inferred strain of the unintended twist from the strain distribution of the multi-core optical fiber.

5. The shape measurement system according to claim 1, wherein the multi-core optical fiber has a cladding diameter of 125 μm (micrometers), and includes cores disposed on a square lattice at an interval of 35 μm or more and 45 μm or less.

6. The shape measurement system according to claim 1, wherein the multi-core optical fiber is hollow at a central axis.

7. The shape measurement system according to claim 1, wherein the strain distribution measurement device measures a backward Brillouin scattering light distribution generated in the multi-core optical fiber.

8. A shape measurement method comprising:

using a multi-core optical fiber in which four or more cores are disposed in a part other than a center of a cross section and measuring, by a strain distribution measurement device, a strain distribution of each of the cores in a longitudinal direction of the multi-core optical fiber;

calculating, by an analysis device, a shape of the multi-core optical fiber by using the strain distribution of the multi-core optical fiber; and determining a curvature and bending angle at points along the multi-core optical fiber by solving simultaneous equations based on axial strain on each core is equal to each other.

9. A shape measurement system comprising:

a multi-core optical fiber in which four or more cores are disposed in a part other than a center of a cross section;

a strain distribution measurement device configured to measure a strain distribution of each of the cores in a longitudinal direction of the multi-core optical fiber; and an analysis device configured to calculate a shape of the multi-core optical fiber by using the strain distribution of the multi-core optical fiber, wherein:

the strain distribution measurement device measures in advance the strain distribution in a reference shape of the multi-core optical fiber, the analysis device calculates the shape of the multi-core optical fiber changed from the reference shape by comparing the strain distribution, measured by the strain distribution measurement device, with the strain distribution in the reference shape, and the analysis device:

obtains a differential strain by using the strain distribution, measured by the strain distribution measurement device, and the strain distribution in the reference shape, calculates a position vector at each point of the multi-core optical fiber where the strain distribution measurement device measures a strain, by using the differential strain, and measures the shape of the multi-core optical fiber in a three-dimensional space by using the position vector.

* * * * *